May 2, 1961 F. K. BECKER 2,982,885

NONLINEAR INTEGRATING CONTROL CIRCUIT

Filed July 24, 1958

INVENTOR
F. K. BECKER
BY A. E. Hirsch Jr.
ATTORNEY

United States Patent Office 2,982,885

Patented May 2, 1961

2,982,885

NONLINEAR INTEGRATING CONTROL CIRCUIT

Floyd K. Becker, Summit, N.J., assignor to Bell Telephone Laboratories, Incorporated, New York, N.Y., a corporation of New York Filed July 24, 1958, Ser. No. 750,818

11 Claims. (Cl. 317—142)

This invention relates to integrating circuits, and more particularly to electronic circuits for effectively regulating the time-constant of passive circuit elements in a nonlinear manner. Its principal object is to vary automatically the time-constant of a control circuit in accordance with certain characteristics of an externally applied stimulus.

Various control circuits are well known in which low frequency signals are utilized to operate relays or the like in control of other independent circuits or devices. For example, it is often desirable for a relay, once actuated, to remain in the actuated state for a predetermined interval of time, and then to release automatically if a new actuating stimulus has not been applied on or before the termination of that interval. Control circuits possessing these characteristics are used in voice operated relay circuits such as echo suppressed toll circuits, lock-out circuits and the like.

Phase-locked oscillators are another class of circuits which utilize a low frequency signal to stabilize their frequency of oscillation. These circuits function optimally with a short time-constant when not in synchronism and with a long time-constant when in synchronism. Similarly, the electrical apparatus provided to protect cathode ray devices from damage by burning in the event of a failure of deflection voltage often includes this type of circuit. These protection circuits generally employ a rectifier and a cascaded integrator to convert deflection frequency control signals to a slowly varying direct-current which, after amplification, is suitable for controlling a relay or the like in an independent signal circuit. The controlled circuit normally is the one employed to provide accelerating potentials to the cathode ray device. The time-constant of the integrator, which may be defined as the time which is required for an applied signal current to achieve a pre-established change from an initial value to a final value, is generally chosen on the basis of the desired response time of the over-all circuit. A fast acting relay or the like, energized by the control signals, quickly disconnects one of the accelerating potential sources of the cathode ray device upon deflection failure. Thus, the overall response time depends primarily on the transmission delay time of the integrator or signal processing circuit, and on the response time of the relay or other responsive device.

At normal television deflection frequencies, sweep voltage samples occur at a sufficiently high rate to enable a protection circuit relay to be held closed for a whole line scan time, thereby to prevent unwanted sweep interruptions. At slower speeds, however, the recurrence rate of such samples is relatively low and, for the same integration circuit, the relay cannot be held closed during the entire line scan. Consequently, the time-constant of a control circuit used in a slow-speed television system must be sufficiently enlarged to hold the relay closed for the entire line scan time in response to short, slowly repeating, signal samples. The magnitude of the time-constant required to do this becomes prohibitively large as the scan rate decreases. Without a suitably fast release time however, a device to be protected may be damaged before the control circuit operates.

There occurs in some cases, moreover, an incompatibility between the important frequency components of a controlling signal and the desired response time of a controlled circuit. The controlled circuit ordinarily includes a switching element capable of quickly breaking a circuit in the event of loss of the control signal. However, in order to prevent the switching element from responding to residual alternating current components in a processed control signal, the time-constant of the rectifier or integration circuit used for developing the control signal, must be selected carefully to have a relatively long delay time in order to eliminate effectively the unwanted components. The net result is a very slow acting circuit which oftentimes is too slow for the desired operation. Thus, although fast acting relay circuits are readily available, it is difficult to match them to the available slow acting driving force without encountering unwanted reactions.

These difficulties may be overcome by effectively regulating the time-constant of a control circuit in a fashion such that the release time of a relay or the like contained therein is suitably fast in the absence of a stimulus and is suitably slow in the presence of suitable stimuli. The present invention relates to such a circuit.

The present invention, in one of its more important aspeects, relates to an electronic control circuit that is responsive to a relatively slow acting control signal, is insensitive to higher frequency signals but, nevertheless, exhibits a sufficiently fast response time. Broadly, the control circuit includes an amplifier circuit possessing a nonlinear amplification characteristic for modifying received control pulses preparatory to their application to the energizing circuit of a relay or the like. The amplifier is arranged in a regenerative configuration whereby the time-constant of the circuit is effectively multiplied by a constant $k$. The factor $k$ is equal to $(A+1)$ where A is the variable gain of the amplifier.

With continuously applied control signals having a pre-established recurrence rate, the amplifier exhibits high gain, the constant $k$ is substantially greater than one, and the time-constant of the over-all circuit is proportionally high, i.e., the physical time-constant of the circuit is multiplied by the factor $k$. In this condition, a relay connected in the amplifier circuit holds for an extended interval which may be selected to be longer than the period between the application of successive control pulses. Upon an interruption in the received train of control pulses, the gain of the amplifier is momentarily held at a high value, and then is rapidly decreased at a rate independent of the absolute magnitude or recurrence rate of applied control signals, whereupon the constant $k$, and hence the time-constant of the circuit, is reduced. Consequently, the relay is quickly de-energized at a precisely defined time and quickly falls out.

Although the invention finds wide and varied application, such as the aforementioned control of phase-locked oscillators and the like, its suitability for use in cathode ray tube sweep protection circuits is obvious. Accordingly, the invention will be described more fully hereinafter primarily in the context of a slow-scan television protection system. It is to be understood, however, that the invention is not limited to this or any one specific application.

The invention will be more fully understood from the following detailed description of certain illustrative embodiments thereof, taken in connection with the appended drawings in which.

Figure 1:
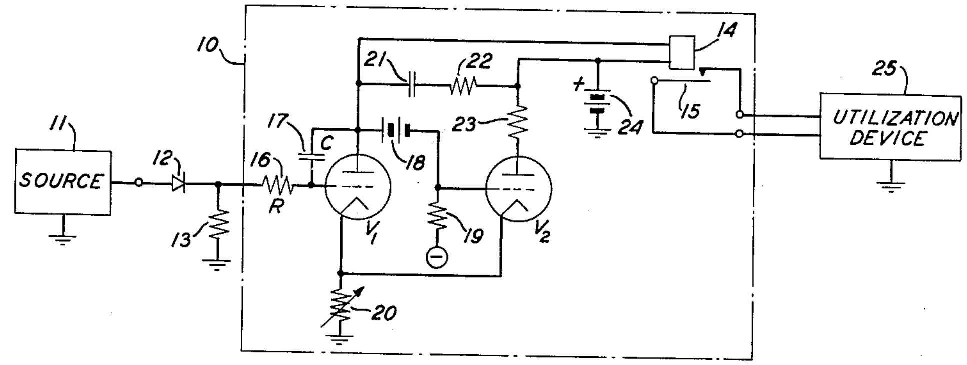
Fig. 1 is a schematic circuit diagram, partially in block schematic form, of one form of an integrating circuit in accordance with the invention.

Referring now to the drawings; Fig. 1 shows an integrating circuit 10, according to the invention, supplied with control pulses derived, for example, from a source 11 of recurring sawtooth waves suitable for deflecting an electron beam in an orthogonal pattern. For television protection circuit applications, both horizontal and vertical deflection waves are ordinarily supplied by source 11. The input control waves, regardless of their exact form or repetition rate, generally lack a direct current component. Accordingly, the applied waves are rectified and shaped by means of diode 12 whereby a direct current control voltage is developed across resistor 13 indicative of the presence of an applied wave train. The magnitude of the control voltage is dependent upon the magnitude of the applied signal waves and is used, following suitable processing, to energize a relay 14 or the like. The contacts 15 of the relay may be used to establish a suitable connection for supplying a necessary potential to a utilization device 25 which may include, for example, a cathode ray display tube.

In prior art protection circuits, the relay is ordinarily provided with a bridging capacitor which charges with each applied wave and aids in holding the relay closed after it has once been energized so long as stimulus is present. Under normal conditions, the charge on the capacitor is restored by the application of a new actuating pulse before the release of the relay. However, in the event of a failure in the energizing source, the capacitor is not recharged and continues to decay until the relay falls out. Since the capacitor follows an exponential decay curve in which the initial rate of decay is dependent, among other factors, upon the magnitude of the previously applied pulses and upon the rate of application of these pulses, the exact instant of relay release is a variable and is dependent on the past history of applied control pulses. Premature release of the relay, therefore, is generally avoided by selecting the relay carefully to have a suffiuiently slow release characteristic. Thus, the time-constant of the slow release relay-capacitor combination is such that consecutive samples of a wave, whose frequency is sufficiently high, hold the relay closed and any interruption permits the relay to open thereby to deprive the utilization device 25 of a necessary potential.

If the frequency is not sufficiently high, means must ordinarily be provided to postpone the moment at which the charge on the capacitor commences to decay until the brief interval before the reception of a new energizing wave. According to the present invention such means are unnecessary inasmuch as the release characteristic of the relay is effectively divorced from the recurrence rate and waveform of the applied energizing signals.

Referring again to Fig. 1, relay energizing current possessing the characteristics necessary to hold the relay closed in response to the low amplitude recurrent energizing pulses and to quickly release it upon a cessation of energizing pulses is provided by variable gain amplifier $V_1$. The gain of amplifier $V_1$ is controlled, in large measure, by positive feedback resulting from the flow of plate current in a second amplifier $V_2$, which current also flows through adjustable cathode resistor 20 connected both to $V_1$ and to $V_2$. An amplified energizing signal is coupled to the grid of $V_2$ by means of battery 18. The battery provides the proper bias for the amplifier. In common with most circuits in which high-gain envelope feedback is employed, the circuit gain must be maintained below a critical value to prevent spurious oscillations. Accordingly, resistor 20 is adjusted to balance the gain of the two amplifiers $V_1$ and $V_2$ to achieve an over-all gain just below the theoretical point of infinite gain.

A relay device 14, or the like, is connected between the anode of amplifier $V_1$ and a source of positive potential 24, and is energized by the direct current component of the plate current flowing in $V_1$. The anode of amplifier $V_2$ is connected to the source of potential 24 by means of resistor 23. Relay 14 is critically damped to insure that it responds at its maximum operating rate by means of capacitor 21 and resistor 22 serially connected across its terminals. Critical damping may be achieved by selecting the values of capacitor 21, resistor 22 and the inductance of the energizing winding of relay 14 in accordance with the well known relationship $$R_t=\sqrt{\frac{L}{C}}$$

where $R_t$ is the total resistance of the relay winding and the total resistance in series with capacitor 21.

The time-constant of the integrating circuit 10 is effectively regulated to afford control of the relay independent of the amplitude or recurrence rate of applied pulses by means of the nonlinear RC circuit comprising resistor 16, serially connected between the source of applied input waves 11 and the control grid of the variable gain amplifier $V_1$, and the effective capacitance measured at the grid of $V_1$ which includes the capacitance of capacitor 17 connected between the grid and anode of $V_1$. Specifically, the effective capacitance of the circuit is equal to $k$C where C is the capacitance of capacitor 17, $k$ is equal to (1+A), and A is the amplification provided by $V_1$ and $V_2$ acting in cascade. Hence, the capacitance of the circuit measured at the grid of $V_1$ is $kC=(1+A)C$. When A is sufficiently large, $k$ is large and the effective capacitance of the circuit is also large. Hence, the time-constant of the circuit is long. When A approaches zero, $k$ approaches unity, and C is reduced to its normal value whereupon the time-constant of the over-all circuit is reduced to that of the time-constant of the RC circuit alone. Thus, the over-all time-constant of control circuit 10 is not fixed, nor is it dependent either on the characteristics of the relay or upon the characteristic of the energizing circuit, but rather is nonlinear and dependent primarily upon the amplification of $V_1$ and $V_2$ acting in cascade.

Figure 2:
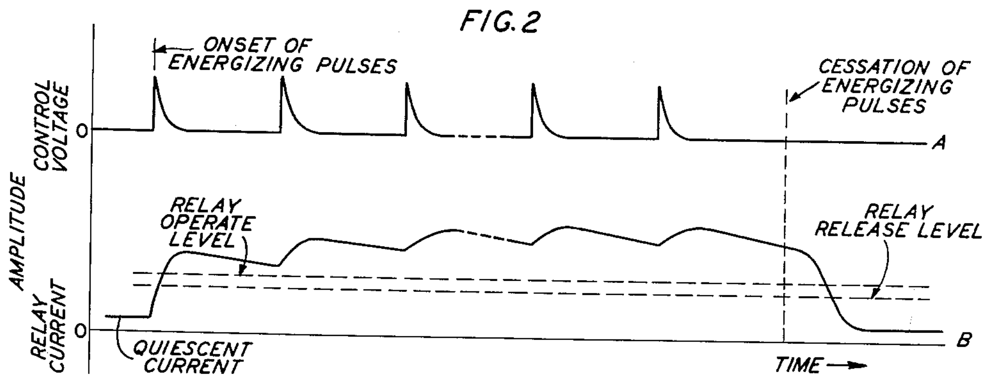
Fig. 2 is a set of characteristic curves illustrating the performance of the apparatus of Fig. 1.

The effect of the nonlinear circuit 10 on the operation of the relay 14 may be appreciated from a consideration of the waveform diagrams shown in Fig. 2. In the presence of an input sequence of control waves from source 11, a rectified voltage wave is developed across resistor 13. This voltage wave is effectively smoothed by resistor 16 and $k$C and applied to the control grid of $V_1$. The rectified energizing wave appearing at the smoothing resistor 16, is illustrated in line A of Fig. 2. At the initial instant of application of the wave, the effective time-constant of the circuit is short because the amplification A of the circuit 10 is small. Accordingly, the rise time of the circuit is initially fast. Thus, the anode current of $V_1$, shown in line B of Fig. 2, increases rapidly and the relay 14 quickly pulls in thereby establishing the desired circuit in device 25. The relay may, if desired, be selected to operate or "pull-in" in response to relatively low level signals, i.e., the relay operate level may be selected within a relative wide range, whereby the effective over-all time-constant of the circuit 10 is correspondingly short.

By virtue of the positive feedback provided by $V_2$, and the variable gain characteristic of $V_1$, the amplification A of the cascaded combination increases so long as the succession of energizing pulses persists. Consequently, as A progressively increases, the degree of integration of the applied pulses becomes more complete, and the time-constant of the circuit is substantially increased. Following each successive applied pulse, the relay current commences to decay but upon the application of a new pulse the gain of the cascaded combination is restored to an effectively high value in a fashion such that the relay current is unable to fall below the release level of the relay before the application of the next energizing pulse.

Upon failure or upon a drastic diminution of the amplitude of the input pulses, which may occur in the event of a deflection voltage failure, for example, the relay current remains relatively constant until well into the period of the first missing pulse. The initial decay of the relay current, unlike that in ordinary protection circuits, is slow because of the high gain of the cascaded circuit. As the relay current subsequently decreases, the gain of the cascaded amplifier rapidly decreases at an every increasing rate, so that the final time-constant once again becomes effectively short. The slope of the decay curve of the relay current is linear and independent of the magnitude of the previously applied voltage pulses, of the number of previously applied pulses, and upon their rate of recurrence. Consequently, the breaking point, i.e., the point at which the avalanche of positive feedback occurs, is precisely defined and may be accurately determined. Once this point has been reached, the relay current is quickly reduced and the relay quickly releases, thereby to accomplish its protective function.

Figure 3:
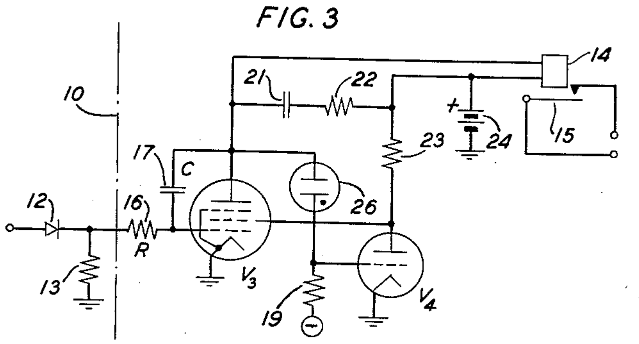
Fig. 3 is a schematic circuit diagram of an alternative form of the invention.

Fig. 3 shows a preferred form of the invention. Elements corresponding to the ones utilized in the form of the invention shown in Fig. 1 are designated by like reference characters. In this embodiment, a pentode amplifier $V_3$ is employed as the variable gain amplifier, and the positive high-gain feedback loop is established by means of a direct current connection from the anode terminal of feedback amplifier $V_4$ to the screen grid of amplifier $V_3$. The output of amplifier $V_3$ is coupled by means of a gaseous diode 26 to the grid of feedback amplifier $V_4$. The diode 26 removes a portion of the direct current plate voltage of amplifier $V_1$ from the grid of $V_2$ to provide the proper bias voltage for the tube.

Because of the screen grid characteristic of the amplifier $V_3$, the gain of the amplifier is essentially constant for changes in screen voltage above a critical value. Below this value, the gain of $V_3$ is approximately directly proportional to the magnitude of the screen-grid voltage. Hence, above the critical value the gain of the cascaded circuits remains essentially constant for small changes in the amplitude or rate of recurrence of applied signal waves, but once the applied waves are reduced to a sufficiently low value, such that the screen voltage of $V_3$ falls below the knee of the characteristic curve, the gain decreases at an extremely rapid rate to provide an extremely fast break. Thus, as before, the release characteristic of a relay 14 or the like, which may conveniently be employed in the practice of the invention, becomes relatively unimportant inasmuch as the nonlinear multiplication factor applied to the relay time-constant circuit assumes this role. If desired, a polarized relay may be used to provide even faster and more positive protection.

When the circuit is used as a portion of a protective device, additional protection is provided by the so-called "fail-safe" characteristic of the circuit. Accordingly, a failure of a critical component of the circuit itself releases the relay thereby to de-energize the potential source connection in the utilization device. In the event of failure of feedback amplifier $V_4$ in the embodiment of the invention shown in Fig. 3, the fast release action of the circuit may be lost. However, since the filament is ordinarily the most vulnerable element of a vacuum tube, fail-safe protection against this sort of falure may be readily achieved by enclosing feedback amplifier $V_4$ in a common envelope with $V_3$, whereby a single filament is used for both tubes. With this arrangement, the desirable characteristic of the circuit is preserved and a relatively high degree of safety is assured.

It can be appreciated that the above-described arrangements are merely illustrations of the principles of the invention. Numerous other arrangements and modifications may be devised by one skilled in the art without departing from the spirit and scope of the invention.

What is claimed is:

1. An electronic control circuit comprising a source of control pulses, an amplifier circuit possessing a nonlinear amplification characteristic, said amplifier circuit having an input terminal, an output terminal and a source of operating potential, means for coupling said source of control pulses to said input terminal of said amplifier, capacitive means coupling said amplifier input terminal to said amplifier output terminal, a current sensitive switching element connected to said amplifier output terminal, and means connected in regenerative coupling relationship with said amplifier for altering the effective amplification of said amplifier in response to the continuity of said applied control pulses.

2. An electronic control circuit comprising a source of signal potential, an amplifier with a variable gain A having an input terminal, an output terminal, and a source of operating voltage therefor, means for coupling said source of signal potential to said input terminal of said amplifier, capacitor means for coupling said amplifier input terminal to said amplifier output terminal, and means connected in regenerative coupling relationship with said amplifier circuit for altering the effective gain A of said amplifier in accordance with the degree of continuity of said applied signal potential thereby correspondingly to alter the effective capacitance of said capacitor means.

3. An electronic control circuit comprising a source of sequentially arranged control pulses, a first amplifier circuit having a variable gain A, said first amplifier circuit having an input terminal and an output terminal, resistor means for coupling said source to the input terminal of said first amplifier, a second amplifier circuit, operating potential means for energizing said first and said second amplifier circuits, a current sensitive switching element responsive to the conduction of said first amplifier circuit, a time-constant circuit associated with said first amplifier circuit, said time-constant circuit including a capacitor C connected between said first amplifier input terminal and said first amplifier output terminal and said resistor means and having a time-constant proportional to the gain A of said first amplifier, and means for connecting said second amplifier circuit in regenerative coupling relationship with said first amplifier circuit whereby the gain A of said first amplifier circuit for applied control pulses having a recurrence rate greater than a pre-established rate is established at a high value, and the gain A of said first amplifier circuit for applied control pulses having a recurrence rate less than said pre-established rate is momentarily held at said high value and subsequently reduced rapidly to a low value.

4. An electronic switching circuit comprising an input for pulsating electrical waves, detector means coupled to said input means and supplied with pulsating electrical waves for producing a unidirectional voltage wave in response to a continuous sequence of said pulsating electrical waves, an amplifying element having an input, being connected to an output, and a source of potential, a resistor serially connected between said detector and said amplifier input for applying said unidirectional voltage wave to said amplifying element, a capacitor connected in shunt circuit arrangement with said amplifying element, said amplifying element being rendered conductive in response to an applied unidirectional voltage wave indicative of the presence of a continuous sequence of said pulsating electrical waves and being rendered substantially nonconductive in the absence of an applied unidirectional voltage wave indicative of a discontinuity in said continuous sequence of pulsating electrical waves, output circuit means coupled to said amplifying element output, and regenerative feedback means associated with said amplifying element for accelerating the response time of said amplifying element following a substantial change in the magnitude of said unidirectional voltage wave.

5. An electronic switching circuit as defined in claim 4 wherein said output circuit means includes relay device responsive to the conduction of said amplifying element and means for critically damping said relay device.

6. An electronic switching circuit as defined in claim 4 wherein said regenerative feedback means comprises an amplifier element having an input, an output and connected to said source of potential, means coupling the output of said first mentioned amplifier element to the input of said feedback amplifier element and means for utilizing the output of said feedback amplifier to alter the amplification characteristic of said first mentioned amplifier element.

7. In combination, an integrating circuit comprising an input terminal for receiving applied control pulses, means for increasing the time-constant of said circuit in response to a continuous sequence of said applied control pulses and for decreasing the time-constant of said circuit in response to a discontinuity in said continuous sequence of applied control pulses, said means including a first amplifier circuit coupled to said input terminal for producing output signals, a current sensitive switching element responsive to said output signals connected in said first amplifier circuit, a second amplifier circuit whose gain is a function of the magnitude of said output signals, a source of potential for operating said first and said second amplifier circuits and feedback means connected between said second amplifier circuit and said first amplifier circuit for effectively controlling the amplification characteristic of said first amplifier.

8. The combination defined in claim 7 wherein said first amplifier circuit comprises a vacuum tube having at least a control electrode, an anode and a cathode, said second amplifier circuit comprises a vacuum tube having at least a control electrode, an anode and a cathode, and said feedback means includes adjustable resistor means connected between the cathodes of both of said tubes and a point of reference potential.

9. The combination defined in claim 7 wherein said first amplifier circuit comprises a vacuum tube having a control electrode, an anode, a cathode and at least one auxiliary control electrode intermediate said control electrode and said anode, said second amplifier circuit comprises a vacuum tube having at least a control electrode, an anode and a cathode, and said feedback means includes a connection between the output of said second amplifier circuit and an electrode intermediate said control electrode and said anode of said first amplifier circuit.

10. An electronic switching circuit comprising an input terminal for receiving control signals, means coupled to said input terminal for producing from said control signals a direct current signal whose presence is an indication of the continuity of said control signals, an amplifier circuit having a variable amplification A which includes a first amplifying device having an input and an output, a second amplifying device having an input and an output, and potential means for energizing said amplifying devices, means for applying said direct current signal to the input of said first amplifying device, means for coupling the output of said first amplifying device to the input of said second amplifying device, capacitor means having a capacitance C connected between the input and the output of said first amplifying device, whereby the effective capacitance of said amplifier circuit measured at the input of said first amplifying device is equal to $(1+A)C$, and regenerative feedback means connected between said second amplifying device and said first amplifying device for altering the amplification A of said amplifier circuit in response to the magnitude of said direct current signal.

11. An electronic control circuit comprising a source of signals having a predetermined recurrence rate, a first amplifier having a variable gain, said first amplifier having an input terminal and an output terminal, resistor means for coupling said source to the input terminal of said first amplifier, a second amplifier, operating potential means for energizing said first and said second amplifiers, a time-constant circuit associated with said first amplifier, said time-constant circuit including (1) a capacitor connected between said first amplifier input terminal and said first amplifier output terminal and (2) said resistor means, and having a time-constant proportional to the gain of said first amplifier, and means for connecting said second amplifier in regenerative coupling relationship with said first amplifier, whereby the gain of said first amplifier for applied signals having a recurrence rate greater than said predetermined rate is established at a high value, and the gain of said first amplifier for applied signals having a recurrence rate less than said predetermined rate is momentarily held at said high value and subsequently reduced rapidly to a low value.

References Cited in the file of this patent

UNITED STATES PATENTS

| | | |
|---|---|---|
| 2,507,211 | Manke et al. | May 9, 1950 |
| 2,591,810 | Hart | Apr. 8, 1952 |